US012580128B2

(12) United States Patent (10) Patent No.: US 12,580,128 B2

Iguchi et al. (45) Date of Patent: Mar. 17, 2026

(54) DIELECTRIC COMPOSITION AND ELECTRONIC COMPONENT

(71) Applicant: TDK Corporation, Tokyo (JP)

(72) Inventors: Toshihiro Iguchi, Tokyo (JP); Tetsuhiro Takahashi, Tokyo (JP); Hiroki Akiba, Tokyo (JP); Ryota Nomura, Tokyo (JP)

(73) Assignee: TDK CORPORATION, Tokyo (JP)

( * ) Notice: Subject to any disclaimer, the term of this patent is extended or adjusted under 35 U.S.C. 154(b) by 775 days.

(21) Appl. No.: 17/951,305

(22) Filed: Sep. 23, 2022

(65) Prior Publication Data

US 2023/0145549 A1 May 11, 2023

(30) Foreign Application Priority Data

Nov. 5, 2021 (JP) ................................. 2021-181080

(51) Int. Cl.
 *H01G 4/12* (2006.01)
(52) U.S. Cl.
 CPC ................................. *H01G 4/1254* (2013.01)

(58) Field of Classification Search
 CPC ...... H01G 4/1254; H01G 4/1209; H01G 4/30; H01G 4/1227; H01G 4/018; H01G 4/12
 See application file for complete search history.

(56) References Cited

U.S. PATENT DOCUMENTS

| 2003/0186802 | A1 | 10/2003 | Watanabe et al. |
| 2014/0177130 | A1 | 6/2014 | Park et al. |

FOREIGN PATENT DOCUMENTS

| CN | 103896587 A | 7/2014 |
| JP | H06-290636 A | 10/1994 |
| JP | 2000-103671 A | 4/2000 |
| WO | 2002/000568 A1 | 1/2002 |

OTHER PUBLICATIONS

Lu, Li, et al. "Annealing and Composition Effects of (BaxSr1-x) Ta2O6 Thin Films Fabricated by Sol-Gel Method." Japanese Journal of Applied Physics 49.9S (2010): 09MA14. (Year: 2010).*

* cited by examiner

*Primary Examiner* — Laura A Auer

(74) *Attorney, Agent, or Firm* — Oliff PLC

(57) ABSTRACT

A dielectric composition includes a main component containing tantalum and at least one of barium or strontium, and a subcomponent containing calcium and silicon.

6 Claims, 1 Drawing Sheet

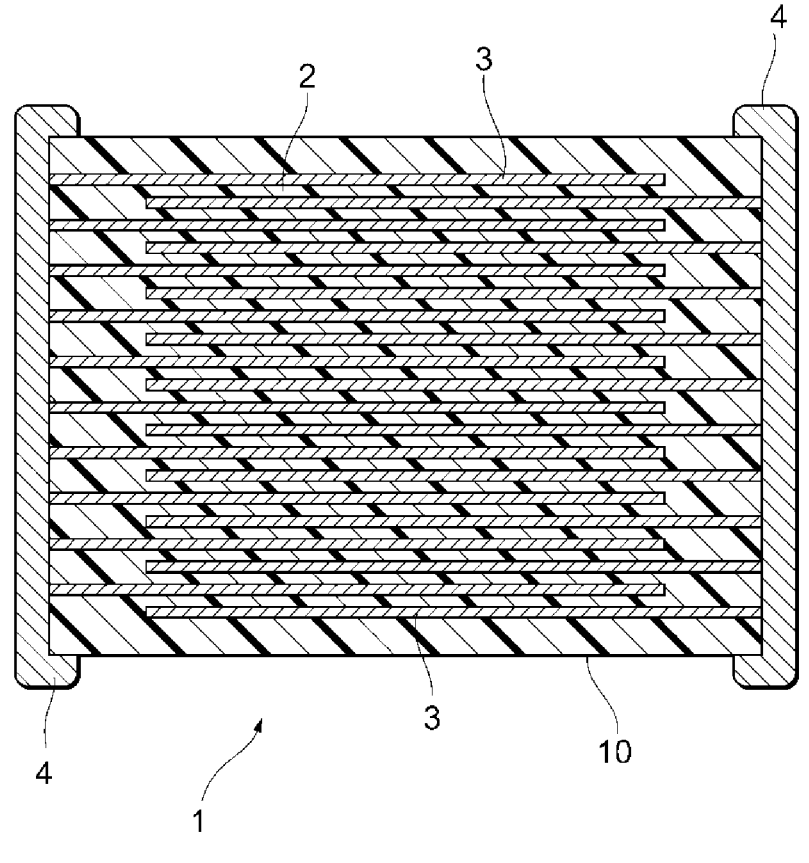

DIELECTRIC COMPOSITION AND ELECTRONIC COMPONENT

Priority is claimed to Japanese Patent Application No. 2021-181080 filed on Nov. 5, 2021, the disclosure of which is incorporated by reference in its entirety.

TECHNICAL FIELD

The present invention relates to a dielectric composition and an electronic component.

BACKGROUND

A dielectric composition that does not include lead or alkali metals but has a high relative permittivity has been developed as shown in, for example, JP Patent Application Laid Open No. 2000-103671.

Unfortunately, such a newly developed dielectric composition needs to be fired at a high temperature to be a highly dense dielectric.

SUMMARY

The present invention has been achieved under such circumstances. It is an object of the invention to provide a dielectric composition having a high density even when the dielectric composition is fired at a relatively low temperature.

A dielectric composition according to the present invention includes a main component containing tantalum and at least one of barium or strontium, and a subcomponent containing calcium and silicon.

The dielectric composition according to the present invention has a high density and a high relative permittivity even when fired at a relatively low temperature. The reason is considered to be as follows.

It is assumed that including calcium and silicon in the subcomponent of the dielectric composition according to the present invention makes it easier for the constituent elements of the main component to move via the subcomponent. Consequently, it is assumed that the dielectric composition can have a high density even when the dielectric composition is fired at a relatively low temperature. The dielectric composition can also have a high relative permittivity.

Preferably, the main component includes strontium.

This can further increase the density and the relative permittivity even when the dielectric composition is fired at a relatively low temperature.

Preferably, the main component includes barium and strontium.

This can further increase the density and the relative permittivity even when the dielectric composition is fired at a relatively low temperature.

Preferably, the subcomponent further includes barium.

This can further increase the density and the relative permittivity even when the dielectric composition is fired at a relatively low temperature.

Preferably, the total amount of calcium and silicon with respect to 100 parts by mass of the total amount of the dielectric composition is 0.5 to 10 parts by mass in terms of calcium oxides and silicon oxides provided that calcium has a valence of 2 and silicon has a valence of 4.

Preferably, the main component is represented by $\{Ba_xSr_{(1-x)}\}_mTa_4O_{12}$, and x has a value of 0.75 or less. This further increases the relative permittivity and the density and, moreover, increases the resistivity and reduces the dielectric loss.

Preferably, m has a value of 1.8 to 2.2. This further increases the relative permittivity, the density, and the resistivity, and further reduces the dielectric loss.

Preferably, the crystal system of the crystals of the main component is tetragonal.

Preferably, the dielectric composition according to the present invention substantially does not include niobium, alkali metals, or lead.

An electronic component according to the present invention includes the dielectric composition.

BRIEF DESCRIPTION OF THE DRAWING(S)

FIG. 1 is a schematic cross-sectional view of a multilayer ceramic capacitor according to an embodiment of the present invention.

DETAILED DESCRIPTION

Multilayer Ceramic Capacitor

FIG. 1 shows a multilayer ceramic capacitor 1, which is an example of an electronic component according to the present embodiment. The multilayer ceramic capacitor 1 includes an element body 10 having dielectric layers 2 and internal electrode layers 3 laminated alternately. A pair of external electrodes 4 is formed on both ends of the element body 10 and electrically connects with the internal electrode layers 3 alternately arranged inside the element body 10. The element body 10 may have any shape, but normally has a rectangular parallelepiped shape. The dimensions of the element body 10 are not limited and are appropriately determined based on usage.

Dielectric Layers

The dielectric layers 2 include a dielectric composition (described later) according to the present embodiment.

The thickness (inter-layers thickness) of each dielectric layer 2 is not limited and can be determined based on desired characteristics, usage, etc. Normally, the inter-layers thickness is preferably 30 μm or less, more preferably 15 μm or less, and still more preferably 10 μm or less.

Internal Electrode Layers

In the present embodiment, the internal electrode layers 3 are laminated so that their ends are alternately exposed to two end surfaces of the element body 10 facing each other.

The internal electrode layers 3 may include any conductive material. Examples of noble metals that may be used as the conductive material include palladium, platinum, and a silver-palladium alloy. Examples of base metals that may be used as the conductive material include nickel, a nickel-based alloy, copper, and a copper-based alloy. Nickel, a nickel-based alloy, copper, or a copper-based alloy may include various trace components (e.g., phosphorus and/or sulfur) at about 0.1 mass % or less. A commercially available electrode paste may be used to form the internal electrode layers 3. The thickness of the internal electrode layers 3 is determined appropriately based on usage or so.

External Electrodes

The external electrodes 4 may include any conductive material. For example, a known conductive material, such as nickel, copper, tin, silver, palladium, platinum, gold, their alloy, and a conductive resin, may be used. The thickness of the external electrodes 4 is determined appropriately based on usage or so.

Dielectric Composition

The dielectric composition in the dielectric layers 2 according to the present embodiment includes a main component containing tantalum and at least one of barium or strontium.

The main component of the dielectric composition according to the present embodiment preferably includes strontium, and more preferably includes both strontium and barium.

The main component of the dielectric composition according to the present embodiment is represented by $\{Ba_xSr_{(1-x)}\}_mTa_4O_{12}$.

The value of x is preferably 0.75 or less.

The value of m is preferably 1.8 to 2.2 and is more preferably 1.9 to 2.1.

The crystal system of the crystals of the main component of the dielectric composition according to the present embodiment is not limited, but is preferably tetragonal or orthorhombic and is more preferably tetragonal.

The main component means the component occupying 80 to 100 parts by mol or preferably occupying 90 to 100 parts by mol with respect to 100 parts by mol of the elements other than oxygen included in the dielectric composition.

The dielectric composition according to the present embodiment substantially does not include niobium, alkali metals, or lead. This means that the total of niobium, alkali metals, and lead accounts for 10 parts by mol or less or preferably 5 parts by mol or less with respect to 100 parts by mol of the elements other than oxygen included in the dielectric composition.

The dielectric composition according to the present embodiment includes a subcomponent containing calcium and silicon. Preferably, the subcomponent further includes barium.

In the present embodiment, the total amount of calcium and silicon in the dielectric composition with respect to 100 parts by mass of the total amount of the dielectric composition is preferably 0.5 to 10 parts by mass and is more preferably 1 to 5 parts by mass in terms of their oxides provided that calcium has a valence of 2 and silicon has a valence of 4.

The ratio of the amount of substance (mol) of calcium in the dielectric composition according to the present embodiment to the amount of substance (mol) of silicon in the dielectric composition is preferably 0.12 to 1.1 and is more preferably 0.22 to 0.88.

The dielectric composition according to the present embodiment may include, for example, vanadium, titanium, aluminium, magnesium, manganese, chromium, and rare-earth elements, other than the main component and the subcomponent.

Method of Manufacturing Multilayer Ceramic Capacitor

A method of manufacturing the multilayer ceramic capacitor 1 shown in FIG. 1 is explained next.

In the present embodiment, powders (a main component powder and a subcomponent powder) of the main component and the subcomponent constituting the dielectric composition are prepared. A method of preparing the main component powder is not limited. For example, a solid-phase reaction method (e.g., calcining) can be used. Raw materials of the constituent elements of the main component powder or the subcomponent powder are not limited. Oxides of the constituent elements can be used. Various compounds that can give oxides of the constituent elements by firing can also be used.

In the present embodiment, the subcomponent may include barium. Including barium in the subcomponent powder makes it easier for barium to be at a grain boundary. The ratio ("Ba/Si") of the amount of substance (mol) of barium in the subcomponent to the amount of substance (mol) of silicon in the subcomponent is preferably 0.12 to 1.1 and is more preferably 0.22 to 0.88.

The raw materials of the main component powder and the subcomponent powder are weighed to satisfy a predetermined ratio and are then mixed in wet manner for a predetermined time using a ball mill or so. The mixed powder is dried and then heated at 700 to 1300° C. in the air to give a calcined powder of the main component and the subcomponent. The calcined powder may be pulverized for a predetermined time using a ball mill or so.

Then, a paste for manufacturing green chips is prepared. The calcined powder of the main component and the subcomponent, a binder, and a solvent are kneaded and turned into paint to give a dielectric layer paste. The binder and the solvent are known ones.

If necessary, the dielectric layer paste may include additives, such as plasticizers and dispersants.

An internal electrode layer paste is produced by kneading the raw material of the above-mentioned conductive material, a binder, and a solvent. The binder and the solvent are known ones. If necessary, the internal electrode layer paste may include additives, such as sintering inhibitors and plasticizers.

An external electrode paste can be prepared similarly to the internal electrode layer paste.

Green sheets and internal electrode patterns are formed using the pastes and are laminated to give green chips.

If necessary, the green chips are subjected to a binder removal treatment. As for the conditions of the binder removal treatment, for example, the holding temperature is preferably 200 to 350° C.

After the binder removal treatment, the green chips are fired to give the element bodies 10. In the present embodiment, the firing atmosphere is not limited and may be the air or a reducing atmosphere. In the present embodiment, the holding temperature during firing is, for example, 1250 to 1455° C.

After firing, the element bodies 10 are subjected to a reoxidation treatment (annealing) as necessary. As for the annealing conditions, for example, the oxygen partial pressure during annealing is preferably higher than that during firing, and the holding temperature is preferably 1150° C. or lower.

The dielectric composition of the dielectric layers 2 of each element body 10 manufactured as explained above is equivalent to the above-mentioned dielectric composition. The end surfaces of the element body 10 are polished, and the external electrode paste is applied there and baked. This forms the external electrodes 4. As necessary, a coating layer is then formed on the surfaces of the external electrodes 4 by plating or so.

The multilayer ceramic capacitor 1 according to the present embodiment is thus manufactured.

In the present embodiment, including calcium and silicon in the subcomponent of the dielectric composition enables the dielectric composition to have a high density even when the dielectric composition is fired and sintered at a relatively low temperature. The reason is considered to be as follows.

It is assumed that including calcium and silicon in the subcomponent of the dielectric composition according to the present embodiment makes it easier for the constituent elements of the main component to move via the subcomponent. Consequently, it is assumed that the dielectric composition according to the present embodiment can have a high density even when the dielectric composition is fired at a relatively low temperature. The dielectric composition can also have a high relative permittivity.

It is assumed that including barium in the subcomponent makes it further easier for the constituent elements of the main component to move via the subcomponent. Consequently, it is assumed that the dielectric composition can have a higher density and a higher relative permittivity even when the dielectric composition is fired at a relatively low temperature.

According to the present embodiment, including tantalum and at least one of barium or strontium in the main component enables the dielectric composition to have a constant and high relative permittivity at a wide range of temperatures. Specifically, the dielectric composition according to the present embodiment can have a relative permittivity of 35 or more at a temperature of −55 to +150° C., and a relative permittivity of 33 or more at a temperature of −70 to +180° C.

The dielectric composition according to the present embodiment can control its capacitance change within ±22% of the capacitance at 25° C. (reference temperature) under a temperature range of −55 to +150° C., thus satisfying the X8S standard. Further, the dielectric composition can control its capacitance change within ±22% of the capacitance at 25° C. (reference temperature) under a temperature range of −70 to +180° C.

The dielectric composition of the present embodiment can have a high density, a high relative permittivity, a low dielectric loss, and a high resistivity, while substantially not including niobium, alkali metals, or lead.

Examples of dielectric compositions having a high relative permittivity include $(Sr,Ba)Nb_2O_6$ having niobium as a main component, $(Na,K)NbO_3$ including an alkali metal, and $Pb(Zr,Ti)O_3$ including lead.

The dielectric composition according to the present embodiment, which includes tantalum and substantially excludes niobium, tends to have a higher relative permittivity, a lower dielectric loss, and a higher resistivity than a conventional dielectric composition that does not include tantalum and includes niobium. It is assumed that this may be because tantalum oxides are less likely to have oxygen vacancy defects than niobium oxides.

Dielectric properties are properties available for insulators. Thus, a high resistivity is demanded of the dielectric composition so that the dielectric composition does not become a semiconductor or a conductor. As explained above, tantalum oxides are less likely to have oxygen vacancy defects than niobium oxides. In other words, changes in the valence of tantalum oxides are controlled. The valence is less likely to change even when reduction firing is performed for the purpose of firing the dielectric composition and a base metal at the same time. Consequently, it is assumed that reduction of the resistivity of the dielectric composition can be prevented and a high resistivity at a wide range of temperatures can be achieved. It is assumed that a low dielectric loss can be achieved for the same reason.

Additionally, because the dielectric composition according to the present embodiment substantially excludes alkali metals, composition deviation of the dielectric composition and dirt on a furnace due to alkali metal evaporation can be prevented.

The dielectric composition according to the present embodiment substantially excludes lead, whose use is controlled by, for example, Restriction of Hazardous Substances Directive (RoHS).

Hereinabove, the embodiment of the present invention is explained, but the present invention is not to be limited to the embodiment in any way, and the present invention can be carried out in various different embodiments within the scope of the present invention.

The above embodiment explains the case where a multilayer ceramic capacitor exemplifies an electronic component according to the present invention. However, an electronic component according to the present invention is not limited to a multilayer ceramic capacitor and may be any other electronic component having the above-mentioned dielectric composition.

For example, an electronic component according to the present invention may be a single plate ceramic capacitor having a pair of electrodes formed on a single layer dielectric substrate including the above-mentioned dielectric composition.

An electronic component according to the present invention may be a filter, a diplexer, a resonator, an oscillator, or an antenna, as well as a capacitor.

EXAMPLES

Hereinafter, the present invention is explained in further detail with examples and comparative examples, but the present invention is not to be limited thereto.

Experiment 1

Sample Nos. 1 to 3, 11 to 13, 21 to 23, 31 to 33, 41 to 44, and 51 to 54

Powders of barium carbonate, strontium carbonate, and tantalum oxide were prepared as the starting raw materials of the main component of a dielectric composition. The starting raw materials of the main component were weighed so that the main component after firing had the composition shown in Tables 1 to 3.

Raw material powders of the subcomponent shown in Tables 1 to 3 were prepared as the starting raw materials of the subcomponent of the dielectric composition. The starting raw materials of the subcomponent were weighed so that the amount of the subcomponent after firing was as shown in Tables 1 to 3. Note that "the amount of the subcomponent" means the amount in terms of oxides of the constituent elements of the subcomponent with respect to 100 parts by mass of the total amount of the dielectric composition, provided that barium has a valence of 2, calcium has a valence of 2, silicon has a valence of 4, and magnesium has a valence of 2.

Specifically, in Sample Nos. 2, 12, and 22, calcium carbonate and silicon oxide were prepared as the starting raw materials of the subcomponent. In Sample Nos. 2, 12, and 22, the ratio ("Ca/Si") of the amount of substance (mol) of calcium in the subcomponent to the amount of substance (mol) of silicon in the subcomponent was 0.42.

In Sample Nos. 3, 13, and 23, barium carbonate, calcium carbonate, and silicon oxide were prepared as the starting raw materials of the subcomponent. In Sample Nos. 3, 13, and 23, the value of Ba/Si was 0.58, and the value of Ca/Si was 0.42.

Next, the weighed powders were mixed in wet manner with a ball mill using ion-exchanged water as a dispersion medium, and this mixture was dried to give a mixed raw material powder. Then, the mixed raw material powder was heated at a holding temperature of 900° C. for a holding time of two hours in the air to give a calcined powder of the main component and the subcomponent.

The calcined powder of the main component and the subcomponent was pulverized in wet manner with a ball mill using ion-exchanged water as a dispersion medium and was dried to give a dielectric raw material.

10 parts by mass of water solution including 6 parts by mass of polyvinyl alcohol resin as a binder were added to 100 parts by mass of the dielectric raw material for granulation to give a granulated powder.

The granulated powder was introduced into a φ 12 mm mold, temporarily press-molded with a pressure of 0.6 ton/cm², and press-molded with a pressure of 1.2 ton/cm² to give a disc-shaped green body.

The green body was subjected to a binder removal treatment, fired, and annealed under the following conditions to give an element body.

following methods. For the measurement of the relative permittivity, an In—Ga electrode paste was applied to the dielectric composition (sintered body) to give a disc-shaped ceramic capacitor sample (capacitor sample).

Density

The density of the dielectric composition was measured as follows. The volume "V" of the dielectric composition was first calculated. The mass "m" of the disc-shaped dielectric composition was then measured. The density of the dielectric composition was calculated by dividing "m" by "V" (m/V). Tables 1 to 3 show the results.

Relative Permittivity

A signal with a frequency of 1 kHz and an input signal level (measurement voltage) of 1 Vrms was applied to the capacitor sample using a digital LCR meter (4284A manufactured by YHP) at room temperature (20° C.) to measure the capacitance "C". Then, the relative permittivity was calculated using the thickness of the sintered body, the effective electrode area, and the measured capacitance "C". Tables 1 to 3 show the results.

TABLE 1

| Sample No. | Main component | Subcomponent | | Density [g/cm³] | Relative permittivity |
| | | Element | Amount in terms of oxides [Parts by mass] | | |
|---|---|---|---|---|---|
| 1 | $Ba_2Ta_4O_{12}$ | None | | 3.11 | 30 |
| 2 | $Ba_2Ta_4O_{12}$ | Ca—Si | 3 | 4.51 | 51 |
| 3 | $Ba_2Ta_4O_{12}$ | Ba—Ca—Si | 3 | 4.57 | 52 |
| 11 | $BaSrTa_4O_{12}$ | None | | 3.21 | 29 |
| 12 | $BaSrTa_4O_{12}$ | Ca—Si | 3 | 4.58 | 53 |
| 13 | $BaSrTa_4O_{12}$ | Ba—Ca—Si | 3 | 4.62 | 53 |
| 21 | $Sr_2Ta_4O_{12}$ | None | | 3.34 | 34 |
| 22 | $Sr_2Ta_4O_{12}$ | Ca—Si | 3 | 4.62 | 55 |
| 23 | $Sr_2Ta_4O_{12}$ | Ba—Ca—Si | 3 | 4.68 | 58 |
| 31 | $BaSrTa_4O_{12}$ | Ca | 3 | 3.22 | 30 |
| 32 | $BaSrTa_4O_{12}$ | Si | 3 | 3.27 | 31 |
| 33 | $BaSrTa_4O_{12}$ | Mg | 3 | 3.28 | 30 |

As for the conditions of the binder removal treatment, the holding temperature was 400° C., the temperature holding time was two hours, and the atmosphere was the air.

As for the firing conditions, the holding temperature was 1340° C., the temperature holding time was two hours, and the atmosphere was a humidified $N_2+H_2$ mixed gas (the oxygen partial pressure was $10^{-12}$ MPa). A wetter was used to humidify the ambient gas used in firing.

As for the annealing conditions, the holding temperature was 1050° C., the temperature holding time was two hours, and the ambient gas was a humidified $N_2$ gas (oxygen partial pressure was $10^{-7}$ MPa). A wetter was used to humidify the ambient gas used in annealing.

TABLE 2

| Sample No. | Main component | Subcomponent | | Density [g/cm³] | Relative permittivity |
| | | Element | Amount in terms of oxides [Parts by mass] | | |
|---|---|---|---|---|---|
| 41 | $BaSrTa_4O_{12}$ | Ca—Si | 0.5 | 4.28 | 49 |
| 42 | $BaSrTa_4O_{12}$ | Ca—Si | 1 | 4.51 | 54 |
| 12 | $BaSrTa_4O_{12}$ | Ca—Si | 3 | 4.58 | 53 |
| 43 | $BaSrTa_4O_{12}$ | Ca—Si | 5 | 4.57 | 54 |
| 44 | $BaSrTa_4O_{12}$ | Ca—Si | 10 | 4.32 | 49 |

TABLE 3

| Sample No. | Main component | Subcomponent | | | Density [g/cm³] | Relative permittivity |
| | | Element | Amount in terms of oxides [Parts by mass] | Ca/Si | | |
|---|---|---|---|---|---|---|
| 51 | $BaSrTa_4O_{12}$ | Ca—Si | 3 | 0.12 | 4.23 | 47 |
| 52 | $BaSrTa_4O_{12}$ | Ca—Si | 3 | 0.22 | 4.53 | 52 |
| 12 | $BaSrTa_4O_{12}$ | Ca—Si | 3 | 0.42 | 4.58 | 53 |
| 53 | $BaSrTa_4O_{12}$ | Ca—Si | 3 | 0.88 | 4.52 | 52 |
| 54 | $BaSrTa_4O_{12}$ | Ca—Si | 3 | 1.1 | 4.37 | 49 |

The density and the relative permittivity of the sintered body (dielectric composition) were measured using the According to Table 1, it was confirmed that samples had a higher density and a higher relative permittivity when calcium and silicon were included as the subcomponent (Sample Nos. 2, 3, 12, 13, 22, and 23) than when not both of the elements were included (Sample Nos. 1, 11, 21, and 31 to 33).

According to Table 2, it was confirmed that samples had a high density and a high relative permittivity when the amount of calcium and silicon in terms of their oxides was 0.5 to 10 parts by mass (Sample Nos. 12 and 41 to 44), and a higher density and a higher relative permittivity when the amount of calcium and silicon in terms of their oxides was 1 to 5 parts by mass (Sample Nos. 12, 42, and 43).

According to Table 3, it was confirmed that samples had a high density and a high relative permittivity when the value of Ca/Si was 0.12 to 1.1 (Sample Nos. 12 and 51 to 54), and a higher density and a higher relative permittivity when the value of Ca/Si was 0.22 to 0.88 (Sample Nos. 12, 52, and 53).

Note that, because silicon and calcium were included only as the subcomponent in the present example, samples with a Ca/Si value of 0.12 to 1.1 (Sample Nos. 12 and 51 to 54) were equivalent to samples with a ratio of the amount of substance (mol) of calcium in the dielectric composition to the amount of substance (mol) of silicon in the dielectric composition of 0.12 to 1.1 (Sample Nos. 12 and 51 to 54). Similarly, samples with a Ca/Si value of 0.22 to 0.88 (Sample Nos. 12, 52, and 53) were equivalent to samples with a ratio of the amount of substance (mol) of calcium in the dielectric composition to the amount of substance (mol) of silicon in the dielectric composition of 0.22 to 0.88 (Sample Nos. 12, 52, and 53).

Experiment 2

Sample Nos. 61 to 63, 71, and 72

In Sample Nos. 61 to 63, 71, and 72, the dielectric composition was produced similarly to Experiment 1 to measure the density and the relative permittivity, except that the component and the amount of the starting raw materials of the dielectric composition were as shown below. Tables 4 and 5 show the density and the relative permittivity of each sample.

In Experiment 2, powders of barium carbonate, strontium carbonate, and tantalum oxide were prepared as the starting raw materials of the main component of the dielectric composition. The starting raw materials of the main component were weighed so that the main component represented by $\{Ba_xSr_{(1-x)}\}_mTa_4O_{12}$ after firing had the composition shown in Table 4 or Table 5.

Note that the subcomponent included calcium and silicon, and the value of Ca/Si was 0.42. Also note that the amount of the subcomponent was 3 parts by mass in terms of their oxides with respect to 100 parts by mass of the total amount of the dielectric composition.

TABLE 4

| Sample No. | Ba + Sr (m) | Ba ratio (x) | Sr ratio | Ba | Sr | Ta | Density [g/cm³] | Relative permittivity |
|---|---|---|---|---|---|---|---|---|
| 61 | 2.0 | 0.75 | 0.25 | 1.50 | 0.50 | 4 | 4.51 | 51 |
| 12 | 2.0 | 0.50 | 0.50 | 1.00 | 1.00 | 4 | 4.58 | 53 |
| 62 | 2.0 | 0.25 | 0.75 | 0.50 | 1.50 | 4 | 4.55 | 53 |

TABLE 4-continued

| Sample No. | Ba + Sr (m) | Ba ratio (x) | Sr ratio | Ba | Sr | Ta | Density [g/cm³] | Relative permittivity |
|---|---|---|---|---|---|---|---|---|
| 63 | 2.0 | 0.10 | 0.90 | 0.20 | 1.80 | 4 | 4.58 | 54 |
| 22 | 2.0 | 0.00 | 1.00 | 0.00 | 2.00 | 4 | 4.62 | 55 |

TABLE 5

| Sample No. | Ba + Sr (m) | Ba ratio (x) | Sr ratio | Ba | Sr | Ta | Density [g/cm³] | Relative permittivity |
|---|---|---|---|---|---|---|---|---|
| 70 | 1.80 | 0.50 | 0.50 | 1.00 | 1.00 | 4 | 4.51 | 51 |
| 71 | 1.90 | 0.50 | 0.50 | 1.00 | 1.00 | 4 | 4.53 | 52 |
| 12 | 2.00 | 0.50 | 0.50 | 1.00 | 1.00 | 4 | 4.58 | 53 |
| 72 | 2.10 | 0.50 | 0.50 | 1.00 | 1.00 | 4 | 4.54 | 52 |
| 73 | 2.20 | 0.50 | 0.50 | 1.00 | 1.00 | 4 | 4.51 | 51 |

According to Tables 4 and 5, it was confirmed that samples had a high density and a high relative permittivity when the main component was represented by $\{Ba_xSr_{(1-x)}\}_mTa_4O_{12}$, the value of x was 0.75 or less (Sample Nos. 12, 22, and 61 to 63), and the value of m was 1.90 to 2.10 (Sample Nos. 12, 71, and 72).

NUMERICAL REFERENCES

1 . . . multilayer ceramic capacitor
10 . . . element body
2 . . . dielectric layer
3 . . . internal electrode layer
4 . . . external electrode

What is claimed is:

1. A dielectric composition comprising:
a main component including tantalum and at least one of barium or strontium; and
a subcomponent including calcium and silicon,
wherein the main component is the component occupying 80 to less than 100 parts by mol with respect to 100 parts by mol of the elements other than oxygen included in the dielectric composition; and
a total amount of calcium and silicon in the dielectric composition with respect to 100 parts by mass of a total amount of the dielectric composition is 0.5 to 10 parts by mass in terms of calcium oxides and silicon oxides provided that calcium has a valence of 2 and silicon has a valence of 4.

2. The dielectric composition according to claim 1, wherein
the main component comprises strontium.

3. The dielectric composition according to claim 1, wherein
the main component comprises barium and strontium.

4. The dielectric composition according to claim 1, wherein
the subcomponent further comprises barium.

5. The dielectric composition according to claim 1,
wherein the main component is represented by $\{Ba_xSr_{(1-x)}\}_mTa_4O_{12}$; and
x has a value of 0.75 or less; and
m has a value of 1.8 to 2.2.

6. An electronic component comprising the dielectric composition according to claim 1.

* * * * *